(12) United States Patent
Mayeux et al.

(10) Patent No.: US 12,157,554 B2
(45) Date of Patent: Dec. 3, 2024

(54) GLAZING MOUNTED ON A STRUCTURE BY FIXING POINTS OF WHICH AT LEAST ONE IS FREE OF PLAY WITH RESPECT TO THE GLAZING OR TO A PINCHING FRAME THEREOF

(71) Applicant: SAINT-GOBAIN GLASS FRANCE, Courbevoie (FR)

(72) Inventors: Jean-Benoît Mayeux, Saint Jean de Braye (FR); Flavien Fremy, Brookline, MA (US)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 0 days.

(21) Appl. No.: 17/768,715

(22) PCT Filed: Oct. 12, 2020

(86) PCT No.: PCT/EP2020/078588

§ 371 (c)(1),
(2) Date: Apr. 13, 2022

(87) PCT Pub. No.: WO2021/074069

PCT Pub. Date: Apr. 22, 2021

(65) Prior Publication Data

US 2024/0132197 A1   Apr. 25, 2024
US 2024/0228010 A9   Jul. 11, 2024

(30) Foreign Application Priority Data

Oct. 14, 2019   (FR) ...................................... 1911415

(51) Int. Cl.
*B64C 1/14* (2006.01)

(52) U.S. Cl.
CPC .................................. *B64C 1/1492* (2013.01)

(58) Field of Classification Search
CPC ..................................................... B64C 1/1492
See application file for complete search history.

(56) References Cited

U.S. PATENT DOCUMENTS 2,834,998 A * 5/1958 Wilder .................. B64C 1/1492
                                                     52/81.6
5,464,261 A * 11/1995 Alkhoury ................ E05B 65/08
                                                    292/DIG. 47

(Continued)

FOREIGN PATENT DOCUMENTS

DE   196 42 175 A   4/1998
FR   2 939 104 A1   6/2010

(Continued)

OTHER PUBLICATIONS

International Search Report as issued in International Patent Application No. PCT/EP2020/078588, dated Dec. 11, 2020.

*Primary Examiner* — Mark R Wendell

(74) *Attorney, Agent, or Firm* — Pillsbury Winthrop Shaw Pittman LLP

(57) ABSTRACT

A monolithic or laminated glazing is bolted or pinched by a frame which is itself bolted onto or through a structure, wherein, in at least part of the periphery of the glazing of maximum flexibility or of minimum stiffness with respect to the buckling phenomenon, the bolting is performed by at least one bolt inserted into a bush concentric to the bolt, or replaced by the insertion of a bush or of a pin, each bush or each pin being mounted without play on the glazing or on the frame, and on or through the structure.

11 Claims, 4 Drawing Sheets

(56) References Cited

U.S. PATENT DOCUMENTS

2012/0228428 A1  9/2012 Deganis et al.
2014/0363254 A1  12/2014 Kondo

FOREIGN PATENT DOCUMENTS

FR           3 039 128 A1   1/2017
WO    WO 2014/183611 A1   11/2014

* cited by examiner

[Fig. 1]
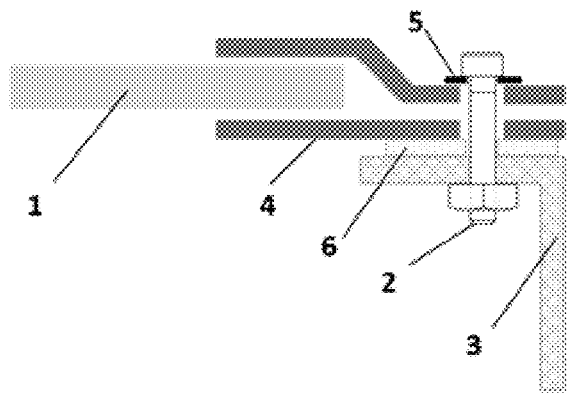
[Fig. 2]
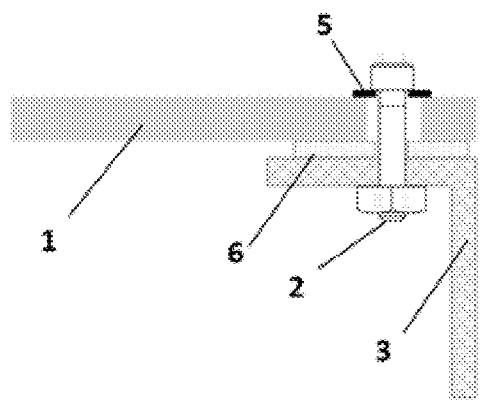
[Fig. 3]
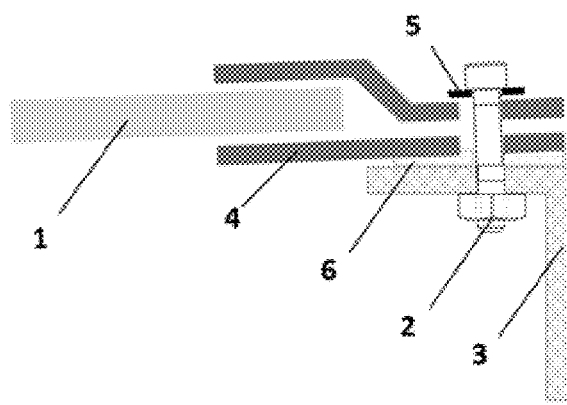

[Fig. 4]
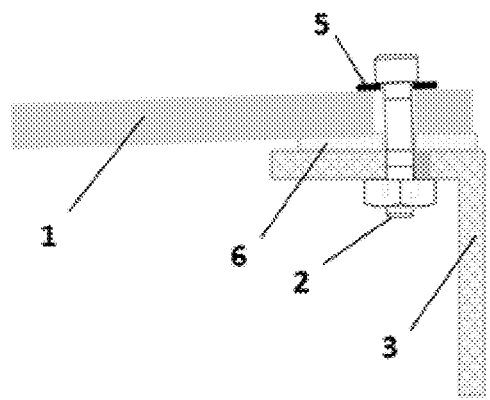
[Fig. 5]
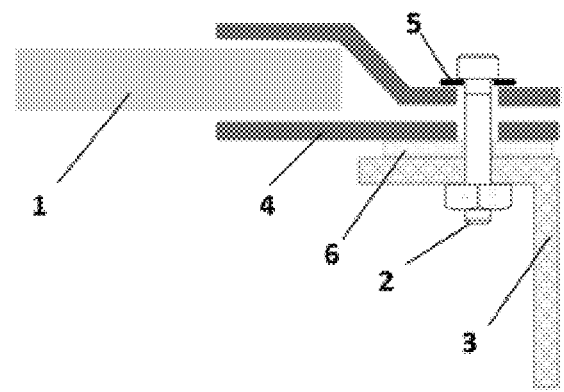
[Fig. 6]
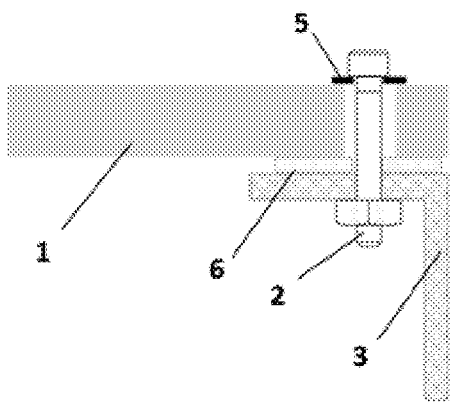

[Fig. 7]
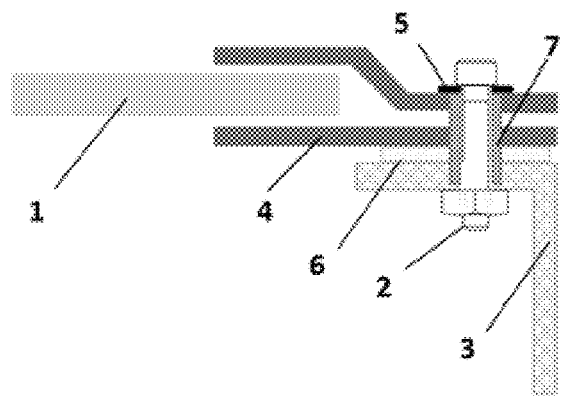
[Fig. 8]
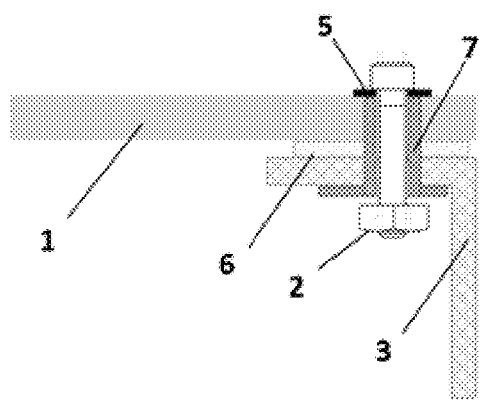
[Fig. 9]
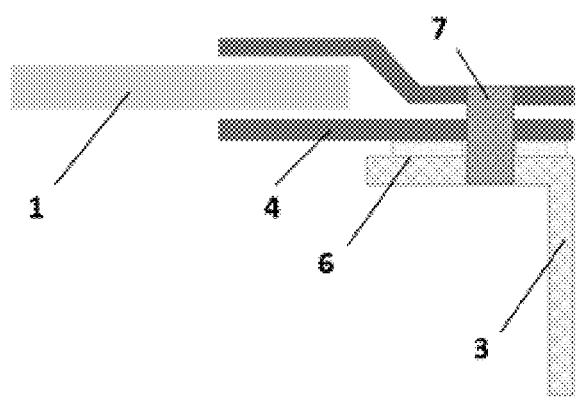

[Fig. 10]
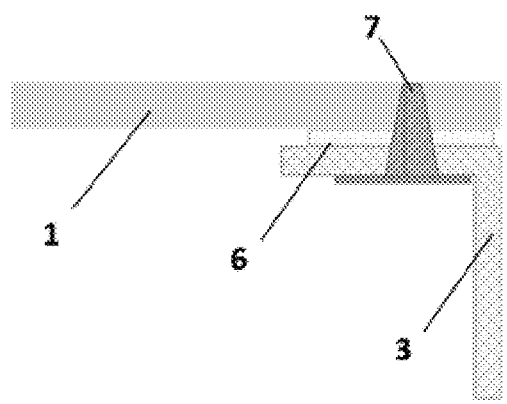

GLAZING MOUNTED ON A STRUCTURE BY FIXING POINTS OF WHICH AT LEAST ONE IS FREE OF PLAY WITH RESPECT TO THE GLAZING OR TO A PINCHING FRAME THEREOF

CROSS-REFERENCE TO RELATED APPLICATIONS

This application is the U.S. National Stage of PCT/EP2020/078588, filed Oct. 12, 2020, which in turn claims priority to French patent application number 1911415 filed Oct. 14, 2019. The content of these applications are incorporated herein by reference in their entireties.

The invention relates to the field of bolted vehicle glazings (land, aquatic or airborne vehicles) subjected to pressures (static or dynamic) that can present a risk of buckling. A static pressure here refers to a pressure exerted on the outer face of the glazing of an aircraft, for example, at constant non-zero speed, and a dynamic pressure refers to a pressure exerted on the outer face of the glazing of an aircraft whose speed varies. Buckling is defined as an inversion of curvature of the glazing, generally toward the interior (or toward the cabin) of the airplane under the effect of a load such as the aerodynamic pressure. Since the aerodynamic pressures from outside to inside are low, less than 0.1 bar, with respect to the cabin pressurization level which is greater than 0.6 bar, the buckling phenomenon does not relate to pressurized aircraft glazings.

Currently, the glazings are bolted directly or via a pinching frame of the glazing, onto or through the mounting structure (airplane cockpit, etc.) so as to keep the glazing secured to the latter. The screws keep the glazing pressed on the structure. There can be many fixing points, for example more than 80 for a glazing measuring 1.2 m 2: that means that the screws are to be mounted with a play on the glazing or the pinching frame thereof, so that the holes in this glazing or in this frame are facing the corresponding ones in the structure, for the bolts tightened last.

The translation of the glazing is stopped by friction (under the screw head), and swiveling stresses the body of the screw itself.

To safeguard against the risk of buckling, the possibilities are to thicken the transparency and/or the frame to increase the stiffness of the glazing, and/or to multiply the number of fixing points to stiffen the boundary conditions.

These possibilities pose a number of problems, of variable importance depending on the areas of use (land/air), which are as follows:
  significant increase in weight: thickening the transparency and increasing the number of fixings directly impacts the weight of the glazing; this is particularly problematical in aeronautical applications;
  increased mounting time: increasing the number of fixings means a replacement time that is longer and more costly (in time and in components); moreover, multiplying the number of fixing points increases the complexity of the tightening (order) and the repeatability of the boundary conditions;
  weakening the resistance at the edge: the drill-holes are significant stress concentration zones; increasing the number of drill-holes means increasing the stresses; moreover, a thicker (more stiff) transparency will transmit more stresses to the attachments in the event of impact (bird, pedestrian, animal, projectile, etc.): the edge of the mounting structure and the edge of the glazing (frame) will have to be dimensioned accordingly (heavier).

The invention consists in defining specific fixing points (rigid fixing), combining the traditional function of keeping the glazing pressed on the structure with anti-translation and anti-swiveling functions to locally stiffen the boundary conditions.

To this end, the subject of the invention is a monolithic or laminated glazing, bolted or pinched by a frame which is itself bolted onto or through a structure, characterized in that, in at least a part of the periphery of the glazing of maximum flexibility or of minimum stiffness with respect to the buckling phenomenon, said bolting is performed by means of at least one bolt inserted into a bush concentric to the bolt, or replaced by the insertion of a bush or of a pin, each bush or each pin being mounted without play on the glazing or on the frame, and on or through the structure.

A monolithic glazing consists of a single transparent sheet of mineral glass such as sodocalcic, aluminosilicate, borosilicate, etc., possibly thermally tempered or chemically reinforced, or of polymer material such as poly(methyl methacrylate) (PMMA), polycarbonate (PC), polyurethane (PU), ionomer resin, etc.

A laminated glazing consists of several such transparent sheets of mineral glass or of polymer material glued in pairs by an adhesive interlayer of polyvinyl butyral (PVB), thermoplastic polyurethane (TPU), ethylene-vinyl acetate (EVA), etc.

When a bush is employed, it is inserted without play into a corresponding hole of the glazing or of the pinching frame thereof. The screw of a bolt concentric to the bush can be inserted into the latter, or, on the other hand, the bush is independent of any screw, of any screw-nut (bolt) assembly. The bush, like the pin, is also inserted without play into a corresponding hole of the mounting structure, possibly in passing through the structure.

The rigid fixing points (without play) are specially defined (quantity and position) according to the parameters of the case of use (dimension/form/thickness of the glazing, structural rigidity, distribution of pressure, materials implemented, etc.) to avoid any static indeterminacy and conserve the ability of the product to be mounted without stresses. The number of bushes and pins, the passage of a screw or not in a bush, the forms of the bushes and pins used (seen in more detail hereinbelow), the presence or not of a shoulder on the bushes/pins, and the combined use of different bushes and/or pins will also be adapted according to these parameters of the case of use.

The rigid fixing points according to the invention are advantageous for glazings subjected to pressures likely to provoke buckling and for which there is a desire to limit the weight and/or simplify implementation, mounting and/or replacement.

The invention makes it possible, by combining a few rigid fixing points in the parts of the periphery of the glazing that are the least stiff, where the buckling is likely to begin, with known fixing points, with play, to reduce the total number of fixing points of the glazing without modifying its behavior with respect to the buckling, or to maintain the total number of fixing points by reducing or eliminating the buckling.

Preferably, said bush or said pin consists of a mechanically resistant rigid material such as metal or composite comprising reinforcing fillers and/or fibers.

Preferably, at least one bush has a geometry of cylindrical tube section.

Preferably, at least one pin is cylindrical and solid.

Preferably, at least one pin is tapered and solid.

Preferably, at least one bush or at least one pin has a shoulder, notably for pressing and stopping against the surface of said structure.

Another subject of the invention is the application of a glazing as described above, such as glazing subjected to static or dynamic pressures, in particular aeronautical glazing, and notably airplane or helicopter glazing.

The attached drawings illustrate the invention. The figures are schematic representations in cross section of glazings subjected to static and/or dynamic pressures, notably of an airplane, mounted on a structure.

FIG. 1 and FIG. 2 represent known glazings at rest.

FIG. 3 and FIG. 4 represent known glazings in buckling position.

FIG. 5 and FIG. 6 represent a first known type of solution to the buckling problem.

FIG. 7 and FIG. 8 represent a first type of embodiment according to the invention.

FIG. 9 and FIG. 10 represent a second type of embodiment according to the invention.

Referring to FIG. 1, a glazing 1 of an airplane is pinched by a frame 4 bolted onto a structure 3 (cockpit) by means of a bolt 2 consisting of a screw and a nut. A washer 5 separates the screw head from the top half of the pinching frame 4 of the glazing 1. A watertight and airtight seal 6 separates the bottom half of the frame 4 and the structure 3.

Given the significant number of bolted fixing points of the airplane glazing 1, the screw of the bolt 2 is inserted with play into the hole of the frame 4, in order for the holes of the frame 4 to coincide with the corresponding holes of the structure 3, until the end of the bolting, that is to say including for the bolts to be tightened last.

FIG. 2 differs from FIG. 1 by the absence of an intermediate frame 4, the glazing 1 this time being itself provided with a hole and bolted directly onto and through the cockpit 3. The screw of the bolt 2 is, for the same reasons as in FIG. 1, inserted with play into the hole of the glazing 1.

The mounted glazings of FIGS. 1, respectively 2, are represented in buckling conditions in FIGS. 3, respectively 4. Translation is stopped by friction under the screw head of the frame 4, respectively of the glazing 1. Swiveling stresses the body of the screw itself.

To limit (reduce, eliminate) the buckling, the mounted glazings of FIGS. 1, respectively 2, can be modified by thickening them as represented in FIGS. 5, respectively 6. The increased weight which results therefrom is obviously unfavorable, above all in an aeronautical application.

According to a first embodiment of the invention, the mounted glazings of FIGS. 1, respectively 2, have one or more (not all, generally a minority, a limited number of) modified bolted fixing points as represented in FIGS. 7, respectively 8. A bush 7 is inserted with no play into the hole of the frame 4 or of the glazing 1 on the one hand, of the cockpit 3 on the other hand. The screw of a bolt 2 can be inserted into the bush 7 as represented in FIGS. 7 and 8, but can perfectly well not be.

According to a second embodiment of the invention, the mounted glazings of FIGS. 1, respectively 2, have one or more (not all, generally a minority, a limited number of) modified bolted fixing points as represented in FIGS. 9, respectively 10. A cylindrical, respectively tapered, pin 7 (solid) is inserted with no play into the hole of the frame 4, respectively of the glazing 1. The latter is therefore tapered.

The bush 7 of FIG. 8 like the pin 7 of FIG. 10 has a shoulder for pressing and stopping against the bottom surface of the cockpit 3.

According to the invention, the modification of a limited number of bolted fixing points according to these FIGS. 7, 8, 9 and 10, in the parts of the periphery of the glazing of lesser rigidity, parts where buckling begins, is sufficient to reduce/eliminate the buckling.

The invention claimed is:

1. An assembly comprising a monolithic or laminated glazing and a structure, wherein the monolithic or laminated glazing is (a) bolted onto or through the structure or (b) pinched by a frame which is itself bolted onto or through the structure, wherein, in at least a part of a periphery of the glazing of maximum flexibility or of minimum stiffness with respect to a buckling phenomenon, said bolting is performed by (i) at least one bolt inserted into a bush that extends through the structure and is concentric to the bolt, or (ii) by an insertion of a solid pin with no bolt, said solid pin extending through the structure, and wherein each bush or each pin is mounted without play on the glazing or on the frame, and through the structure.

2. The assembly as claimed in claim 1, wherein said bush or said pin consists of a mechanically resistant rigid material.

3. The assembly as claimed in claim 2, wherein said mechanically resistant rigid material is metal or composite comprising reinforcing fillers and/or fibers.

4. The assembly as claimed in claim 1, wherein at least one bush has a geometry of cylindrical tube section.

5. The assembly as claimed in claim 1, wherein at least one pin is cylindrical and solid.

6. The assembly as claimed in claim 1, wherein at least one pin is tapered and solid.

7. The assembly as claimed in claim 1, wherein at least one bush or at least one pin has a shoulder.

8. The assembly as claimed in claim 7, wherein the shoulder is for bearing and stopping against a surface of the structure.

9. A method comprising subjecting the glazing of the assembly as claimed in claim 1 to static or dynamic pressures.

10. The method as claimed in claim 9, wherein the glazing is an aeronautical glazing.

11. The method as claimed in claim 10, wherein the aeronautical glazing is an airplane or helicopter glazing.

* * * * *